United States Patent [19]

Kabanov et al.

[11] Patent Number: 5,866,660

[45] Date of Patent: Feb. 2, 1999

[54] POLYVINYL PROLIDONE AND CROSSLINKER WITH DIVINYL AND CHELATION GROUP

[75] Inventors: Victor Kabanov; Vladimir Golubev, both of Moscow, Russian Federation

[73] Assignee: ISP Investments Inc., Wilmington, Del.

[21] Appl. No.: 816,281

[22] Filed: Mar. 13, 1997

[51] Int. Cl.⁶ ................................ C08L 39/06; C12H 1/10
[52] U.S. Cl. ........................... 525/281; 525/296; 426/271
[58] Field of Search .............................. 526/264; 525/256, 525/267, 283, 281, 296; 426/271

[56] References Cited

U.S. PATENT DOCUMENTS

| | | | |
|---|---|---|---|
| 3,759,880 | 9/1973 | Hoffmann et al. | 526/264 |
| 3,963,771 | 6/1976 | Robson et al. | |
| 3,992,562 | 11/1976 | Denzinger et al. | 526/264 |
| 5,094,867 | 3/1992 | Detering et al. | 426/271 |

FOREIGN PATENT DOCUMENTS

| | | |
|---|---|---|
| 57-99637 | 6/1982 | Japan . |
| 63-144085Q | 6/1988 | Japan . |
| 825624 | 4/1981 | U.S.S.R. . |
| 1269807 | 4/1972 | United Kingdom . |
| WO 95/27008 | 10/1995 | WIPO . |

OTHER PUBLICATIONS

Caplus accession No. 1986:19841, "Synthesis of condensation polymers by Michael–type polyaddition reaction" by Imai, Yuki Gosei Kagaku Kyokaishi, vol. 43, No. 10, pp. 932–940, 1985.

*Primary Examiner*—Robert E. Sellers
*Attorney, Agent, or Firm*—Walter Katz; William J. Davis; Marilyn J. Maue

[57] ABSTRACT

A crosslinked popcorn polymer of vinyl pyrrolidone and a crosslinker containing a pendant divinyl moiety and a chelating group capable of complexing a heavy metal ion in aqueous solution.

15 Claims, No Drawings

POLYVINYL PROLIDONE AND CROSSLINKER WITH DIVINYL AND CHELATION GROUP

BACKGROUND OF THE INVENTION

1. Field of the Invention

This invention relates to crosslinked polymers of vinyl pyrrolidone, and, more particularly, to such polymers which contain a crosslinker having both a pendant divinyl moiety and a chelation group capable of complexing with and removing heavy metal ions from aqueous solutions, particularly wine and beer.

2. Description of the Prior Art

The term "popcorn" or "proliferous" polymerization was introduced to define a well-known phenomenon, when, in an originally homogeneous liquid monomer, heterogeneous polymer nuclei appear, and there further growth rate becomes predominant. When a certain amount of popcorn polymer is isolated from the reaction mixture and added to the fresh portion of monomer, this polymer is able to continue its propagation and give rise to further development of the popcorn polymer. See C. H. Bamford, et al., "The Kinetics of Vinyl Polymerization by Radical Mechanisms", Butterworths Scientific Publications, London, 1968.

A water-insoluble polymer product of popcorn polymerization is crosslinked polyvinylpolypyrrolidone (PVPP), which has been made by proliferous polymerization of vinyl pyrrolidone (VP). The process may be carried out in the absence of added crosslinker, or in the presence of an added crosslinking agent, or with an in situ generated crosslinker. Such crosslinking polymerization processes are described in U.S. Pat. Nos. 3,277,066; 3,306,886; 3,759,880; 3,933,766; 3,992,562; and 5,094,867; and in an article by F. Haaf et al. in *Polymer J.* 17(1), p. 143–152 (1985), entitled, "Polymers of N-Vinylpyrrolidone:Synthesis, Characterization and Uses".

PVPP polymers are widely employed as clarifying agents in the industrial purification of aqueous wine and beer solutions, particularly for the removal by adsorption of organic impurities such as polyphenols, tannins and anthracyanins which may be present in the aqueous solution. As a result of such treatment, a clear, haze-free wine or beer product may be obtained. However, this polymer is incapable of adsorbing heavy metal ions, in particular, copper and iron ions, which also contribute to the cloudiness of such solutions.

Preferably, methylene bis-acrylamide is used as the crosslinking agent for preparation of PVPP. In this case, the synthesized polymer is characterized by well-pronounced adsorption properties with respect to polyphenols, and this offers substantial advantages for its practical application.

Controlled modification of the properties of PVPP may be accomplished by the introduction of comonomers with vinyl pyrrolidone which contain functional or ligand groups capable of preferential binding of copper or iron ions. For example, U.S. Pat. 5,094,867 described the use of 50–99.5% of a ligand-containing comonomer, particularly, N-vinylimidazole, an amine-containing comonomer, in combination with vinyl pyrrolidone, was described. However, no crosslinking agents have been developed which are able to complex strongly with copper ions.

Accordingly, it is an object of this invention to provide new and improved polyvinylpolypyrrolidone (PVPP) polymers for use in the industrial clarification of wine and beer which will also remove traces of heavy metal cations therein.

Another object herein is to provide crosslinked PVPP polymers including a crosslinker which contains a chelation group in the molecule capable of complexing effectively with a heavy metal ion such as copper or iron in aqueous solution.

Yet another object herein is to provide a crosslinker compound containing a pendant divinyl moiety and a group capable of chelating with heavy metal ions, for use in polymerization of vinyl pyrrolidone to form a new and improved crosslinked PVP.

Still another object herein is to provide a proliferous polymerization process for making such crosslinked polymers of vinyl pyrrolidone.

Among the other objects herein is to provide a process of clarifying an aqueous solution of wine or beer by treatment with a crosslinked polymer of vinyl pyrrolidone monomer and a crosslinker compound containing both a pendant divinyl moiety and a group capable of chelating with a heavy metal ion in aqueous solution.

These and other objects and features of the invention will be made apparent from the following more particular description of the invention.

SUMMARY OF THE INVENTION

A crosslinked polyvinylpolypyrrolidone (PVPP) polymer is provided herein which contains an advantageous crosslinker compound which is covalently incorporated into the network of the polymer. The crosslinker compound of the invention contains both a pendant divinyl moiety and a chelating group capable of effectively complexing a heavy metal ion in aqueous solution.

The pendant divinyl moiety in the crosslinker compound of the invention provides the crosslinking function during polymerization, while the chelating group in the molecule enables the resultant polymer to effectively chelate heavy metal ions during use in clarification of wine and beer beverages.

More particularly, the presence of the chelating group in the PVPP polymer of the invention assures ready removal of such heavy metal ions as $Cu^{2+}$, $Fe^{3+}$ and $Mn^{2+}$ from wine and beer solutions, while retaining its conventional ability to remove polyphenols, tannins and anthrocyanins which also may be present in such solutions. The result is a clarified, haze-free beverage of superior tasting quality.

In the preferred embodiments of the invention, the chelation group is a diamine derivative, preferably a symmetrical diamine, such as ethylenediamine or piperazine, and the pendant divinyl group is furnished by an bis-acrylamide, a bis-acrylate or a bis-methacrylate residue.

The crosslinker compound of the invention may be added directly to a polymerization reaction mixture containing the vinyl pyrrolidone monomer, or it may be generated in situ from its several components. Suitably, the crosslinker may be made by a Michael addition reaction between a divinyl compound and a compound containing the diamine entity.

The proliferous polymerization reaction may be initiated herein by a conventional initiator agent, e.g. azobis(isobutyronitrile) AIBN, or by nuclei of the polymer itself which may be precharged into the reaction mixture, i.e. with added popcorn PVP seeds. The reaction also may be carried out without added initiator.

DETAILED DESCRIPTION OF THE INVENTION

In accordance with the invention, there is provided herein a crosslinked polymer which is a combination of polyvinylpolypyrrolidone and a crosslinker compound containing both a pendant divinyl moiety for crosslinking and a chelating group capable of complexing a heavy metal ion in aqueous solution.

This crosslinker compound is made by a reaction which involves the participation of a compound with double bonds which are conjugated with electron-accepting substituents, and their addition to various nucleophilic agents, in particular, amines and diamines. The reaction is known as a Michael addition. In most cases, this reaction readily proceeds with a yield of about 100%.

The general Michael reaction sequence reaction may be illustrated by the following equation below:

where R is an alkyl group and X is an acrylamido group.

In particular, the desired Michael addition reaction may be effected by reaction between two moles of methylene bis-acrylamide (MBAA) and one mole of a diamine compound having two double bonds, such as ethylene diamine (EDA) or piperazine (PA).

A specific Michael reaction for preparing the desired crosslinker is illustrated by the following equation:

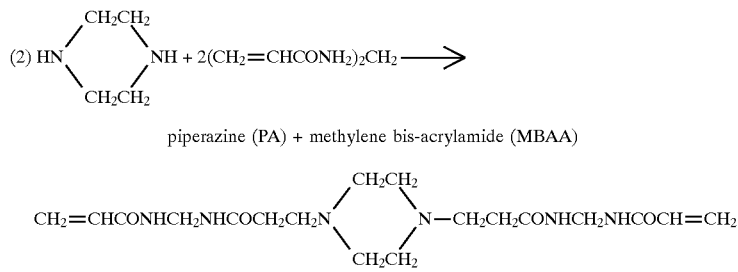

The same Michael reaction of MBAA with ethylenediamine (EDA) in place of PA provides the following di-substituted Michael addition products.

These Michael addition products are used as the crosslinker in the polymerization of vinyl pyrrolidone to generate PVPP polymers having the desired crosslinker compound covalently incorporated into the PVP polymer.

Such crosslinked PVP polymers will have at least 0.1 mole % of this crosslinker therein, preferably up to about 2 mole % or more.

The above polymerization compounds are capable of binding heavy metal ions in an aqueous solution of an impure wine or beer containing such heavy metal ions, e.g. $Cu^{++}$, $Fe^{+++}$ or $Mn^{++}$. Those ions will be complexed by chelation with the diamine moiety of the crosslinker present in the polymer, and removed from solution.

As discussed, synthesis of the desired crosslinking agent is based on a Michael addition reaction between a bifunctional amine, e.g. piperazine (PA) or ethylenediamine (EDA), and a divinyl compound, e.g. MBAA. This reaction proceeds at room temperature in the presence of a four-fold excess of MBAA and is performed by adding a saturated aqueous solution of PA or EDA to the aqueous suspension of MBAA (5–7 ml of $H_2O$ per 1 g of PA or EDA) during a period of about 20 min. Then, after 1 hour, unreacted MBAA or EDA is extracted by acetone. The reaction product containing the crosslinking agent is insoluble in acetone and may be isolated as a residue. The reaction yield is about 100 w.

The crosslinking agent may be synthesized in situ and the reaction product used directly in the polymerization. Accordingly, EDA and MBAA (21:2) are reacted for 1 hour, and the resultant reaction mixture is used polymerization of vinyl pyrrolidone without isolation of the crosslinker reaction product itself.

Polymerization of vinyl pyrrolidone in the presence of crosslinker of invention may be carried out in the presence of an initiator agent, e.g. azobis(iso-butyronitrile—AIBN). In this reaction, the water and AIBN content in the reaction mixture may be varied from 0 to 80 mol % and from $3\times10^{-6}$ to $3\times10^{-5}M$, respectively. The crosslinking agents are high-grade MBAA (0.3–3 mol % with respect to VP) itself (as control) and compounds based on MBAA and piperazine (3 mol %) as well as the reaction mixture of MBAA and EDA. These components also may be directly added to polymerization mixture (in situ reaction). The experiments are performed at 40° C.

The course of the polymerization process is substantially independent of the nature of the crosslinking agent. When the product of Michael's reaction (reaction between MBAA and PA or EDA) was used as the crosslinking agent, the resultant popcorn PVPP was capable of effective preferential adsorption of copper ions from aqueous solutions. More particularly, the PVPP prepared in the presence of an EDA-MBAA mixture provided an adsorption of copper ions which was so strong that they could not be removed by rinsing with water. Depending on experimental conditions, this adsorption varies from 3 to 8 mg/g of polymer. The PA-containing PVPP was somewhat weaker than the EDA-containing PVPP in its adsorption capability for copper ions.

The polymerization process in this invention commences with the development of a viscous transparent liquid, which then becomes slightly opaque. At this stage, in the bulk of reaction mixture, and, in most cases, on its surface or on the surface of the reaction vessel, white flakes of popcorn phase are produced. During further polymerization, growth of popcorn nuclei and thickening of reaction mixture are parallel processes.

The final product of the popcorn polymerization is a mixture of a conventional crosslinked PVP with popcorn PVPP. As compared with PVP, crosslinked PVP is capable of a marked swelling in water; and in the presence of even minor amounts of this polymer, a noticeable deterioration of filtration conditions is observed.

The earlier the nuclei of popcorn phase appear (in less viscous medium), the higher the fractional content of popcorn polymer. With increasing the temperature above 40° C. (to 100° C.), the yield of popcorn PVP decreases to the contrary, with decreasing the temperature to room temperature and even to 0° C. after the development of popcorn nuclei, fractional content of this phase increases.

Popcorn polymerization of vinyl pyrrolidone may be initiated by popcorn poly(vinyl pyrrolidone) seeds themselves. A distinctive feature of popcorn polymerization is that the reaction may be initiated not only by conventional initiator agents but also by the nuclei of the popcorn polymer itself. Accordingly, popcorn polymerization of VP in this invention may be initiated by the nuclei of the as-formed popcorn phase. Similar to crystallization, the nuclei of popcorn phase used for initiation is referred to as "popcorn PVP seeds".

This initiating species of popcorn PVP seeds is introduced into the polymerization mixture as a fine powder. Formation of a friable precipitate then is observed during the polymerization.

The total time of polymerization is controlled by the polymerization conditions. The entire process of popcorn polymerization may be divided into different stages on the assumption that the time corresponding to the completion of popcorn polymerization is 100%.

Hence, popcorn polymerization may be conditionally divided into four stages:

1. Initiation of popcorn polymerization is provided by the addition of popcorn PVP seeds and degasification of the sample. At the early stages of popcorn polymerization (about 20% of the total polymerization time), an evident increase in the volume of precipitate is observed.

2. The popcorn polymer occupies the whole reaction volume, and the reaction mixture remains semi-transparent and becomes rather viscous (during about 50% of the total polymerization time).

3. The volume of the reaction mixture remains unchanged but is filled with white flakes of popcorn PVP (80% of the total polymerization time).

4. The volume of polymerization mixture increases by about 2–3 times, and the reactants are heated slightly. All of the reaction volume then is filled with popcorn PVP. This final stage of polymerization is associated with no further change in the volume of the reaction mixture (100% of polymerization time). In summary, popcorn polymerization proceeds with a marked auto-acceleration, and most of popcorn polymer is produced only at the late stages of the polymerization(75–80% of polymerization time).

The rate of the development of the popcorn phase is controlled by temperature conditions during polymerization. As compared to a normal reaction rate at 22° C., when the polymerization temperature is lowered to −5° C., the reaction rate is decreased by a factor of 17. Similary, with an increase in the temperature to 45° C., the rate is increased by a factor of 12.

The rate of polymerization initiated by polymer seeds is proportional to the amount of the added polymer.

As with any process of radical polymerization, popcorn polymerization is very sensitive to the presence of the traces of oxygen. Accordingly, in this invention, the reactants are evacuated to below $10^{-2}$ torr. Evacuation of the reaction mixture may be substituted for by flushing with argon for about 15–20 min.

The process does not require any stirring of the reaction mixture.

Even under a wide range of polymerization conditions, the yield of popcorn polymer herein is close to the maximal yield (85–90%). The principal source of the loss in the reaction yield is associated with purification by decanting where traces of monomer and crosslinking agent were identified. By introduction of minor amounts of a conventional initiating agent and by increasing the temperature during the late stages of the polymerization reaction, the loss in low-molecular-mass fraction is decreased.

The product of the polymerization is a ligand-containing crosslinking agent which is covalently incorporated into the network of the as-formed popcorn polymer and provide for adsorption of heavy metal ions such as copper ions [Cu(II)] from aqueous wine and beer solutions.

The degree of adsorption of copper ions by the polymer of the invention was measured by two different procedures: (1) by determining the concentration of copper ions Cu(II) remaining in aqueous solution (UV spectroscopy); and (2) by measuring the concentration of copper ions immobilized in popcorn PVP after adsorption (EPR).

As evidenced by EPR measurements, the adsorption capacity of the polymer of the invention with respect to copper ions (adsorption from aqueous solution of $CuSO_4$) was estimated to be as high as 5 mg/g or about 40% of the maximum adsorption calculated for the number of moles of ethylenediamine present in the polymer.

The invention will now be described by reference to the following examples.

EXAMPLE 1

Synthesis of Crosslinker of Invention by Reaction of Methylene Bis-Acrylamide (MBAA) and Piperazine (PA)

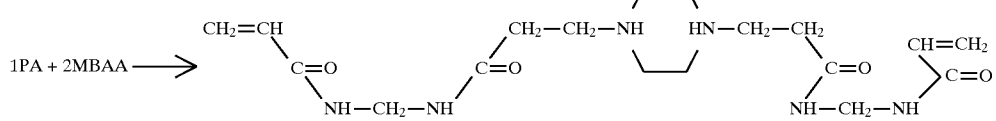

The reaction was carried out in a 4-fold excess of methylene bis-acrylamide (MBAA) at room temperature by drop-wise addition of a saturated aqueous solution of piperazine (PA) (5–7 ml of $H_2O$ per 1 g of PA) to an aqueous suspension of MBAA for 20 minutes. After an hour, the excess, unreacted MBAA was extracted with acetone. The reaction product was insoluble in acetone. The yield was about 100.

EXAMPLE 2

Crosslinked PVP (PVPP) Polymer of Invention Made by Proliferous Polymerization Using the Crosslinker of Example 1

10 ml of a VP/$H_2O$ solution containing 50 mol % $H_2O$, and $3\times10^{-5}$M of AIBN as initiator, was mixed with 927 mg of the crosslinker compound of Example 1 (3.0 mol % with respect to VP). The reaction mixture then was degassed and heated at 40° C. for 24 hours. The resultant PVPP polymer product then was rinsed three times with a total 1.5 l of distilled water for 2 days, (3×0.5 l per rinse). The PVPP product was filtered and dried in vacuum at 50° C. for 7 hours. The yield was substantially 100%.

EXAMPLE 3

Crosslinked PVP (PVPP) Polymer of Invention Made Using Crosslinker of Example 1 Developed In Situ 10 ml of VP/H$_2$O solution containing 50 mol % H$_2$O and 3×10$^{-5}$M of AIBN was mixed with 570 mg of MBAA (4.7 mol % with respect to VP) and 135 mg of PA (2.0 mol % with respect to VP). The polymerization procedure of Example 2 then was repeated to provide a PVPP polymer in which the MBAA and PA components were quantitatively incorporated.

EXAMPLE 4

Crosslinked PVP (PVPP) Polymer of Invention Made Using Crosslinker of MBAA and Ethylenediamine (EDA) Developed In Situ a. 1.1 ml of EDA, 4.61 g of MBAA, and 2 mg of AIBN were added to 80 ml of VP and 37.6 ml of water. This mixture was degasified to a pressure of 2×10$^{-3}$ torr by repeated freezing-defreezing cycles, sealed-off, and allowed to stand at 40° C. After 32 hours, the mixture became viscous, and individual nuclei of popcorn polymer appeared in the bulk and at the walls of the reaction vessel. The resulting mixture then was stirred and cooled down to room temperature. Thereafter, a relatively rapid development of popcorn polymer in bulk had occurred. After 12 hours, polymerization was complete, and the product was rinsed with distilled water and dried under vacuum at 40° C. for 5 hours. The yield of popcorn PVPP was 73 g (85%).

b. In another run, a 10 ml VP/H$_2$O solution containing 50 mol % H$_2$O and 3×10$^{-5}$M of AIBN were mixed with 575 mg of MBAA (4.7 mol % with respect to VP) and 130 $\mu$l of ethylene diamine (EDA) (2.4 mol % with respect to VP). The polymerization procedure of Example 4 was followed to provide a PVPP polymer into which MBAA and EDA were quantitatively incorporated.

c. To a thick-walled vessel (750 ml), 170 ml of VP, 80 ml of water, 12.1 g of MBAA and 3.4 ml of ethylenediamine were added. Then 6.8 g of powdered popcorn PVP was introduced as the initiating species. This mixture then was cooled to 0° C. and evacuated using a fore vacuum pump for 20 min. until no gas bubbles appeared. The loss in liquid associated with distillation was less than 0.1%. Then the reaction vessel was sealed-off and allowed to stand at 20° C. for 7 hours. As a result of heat released during polymerization, the reaction vessel was heated up to 40°–45° C. Within 9 hours, popcorn polymerization was complete.

The popcorn PVPP product was repeatedly washed with distilled water by decanting and by rinsing onto a glass porous filter (total volume of the washing water was 5 l). Excess water was removed using a rotor evaporator. Then the product was dried at 50° C. for 1 day. The yield of PVPP was 168 g (87%).

EXAMPLE 4

Absorption of Cu$^{2+}$ Ions by the Polymers of Examples 2–3

In these examples, solutions of CuSO$_4$·5H$_2$O in distilled water were prepared at concentrations varying from 0.41 to 4.45 mg of copper ions per 1 ml of water. The corresponding UV spectra was taken at 811 nm, and adsorption J of the solution was estimated therefrom. A plot of log (J/J$_O$), and where J$_O$ is UV absorption without copper ions, versus concentration of copper ions, gave a straight line relationship.

Adsorption of copper ions by the polymer of the invention is substantially irreversible. Despite repeated treatments with water over a period of 6 months, a constant amount of the adsorbed copper was preserved in the test samples. However, when the sample was treated with dilute HCl, all the adsorbed copper ions were removed.

While the invention has been described with particular reference to certain embodiments thereof, it will be understood that changes and modifications may be made which are within the skill of the art. Accordingly, it is intended to be bound only by the following claims, in which:

What is claimed is:

1. A crosslinked popcorn polymer of vinyl pyrrolidone and a crosslinker containing a pendant divinyl moiety and a chelating group capable of complexing a heavy metal ion in aqueous solution, wherein said chelating group is a diamine moiety.

2. A polymer according to claim 1 wherein said heavy metal ion is Cu$^{++}$, Fe$^{+++}$ or Mn$^{++}$.

3. A polymer according to claim 1 wherein said polymer also will remove polyphenols, tannins and/or anthracyanins from aqueous solution.

4. A polymer according to claim 1 wherein said diamine moiety is derived from a symmetrical diamine.

5. A polymer according to claim 1 wherein said diamine moiety is derived from ethylenediamine.

6. A polymer according to claim 1 wherein said diamine moiety is derived from piperazine.

7. A polymer according to claim 1 wherein said divinyl moiety is derived from methylene bis-acrylamide.

8. A process of making a crosslinked popcorn polymer which comprises popcorn polymerizing vinyl pyrrolidone and an initiator in the presence of a crosslinker containing a pendant divinyl moiety and a chelating group capable of complexing with a metal ion in aqueous solution, wherein said chelating group is a diamine moiety.

9. A process according to claim 8 wherein said crosslinker is developed in situ during the polymerization.

10. A process according to claim 8 which comprises popcorn polymerizing vinyl pyrrolidone and the reaction product of the Michael addition of two moles of a compound containing a divinyl moiety and one mole of a symmetrical diamine.

11. A process according to claim 8 wherein said diamine moiety is derived from a symmetrical diamine.

12. A process according to claim 11 wherein said symmetrical diamine is ethylenediamine.

13. A process according to claim 11 wherein said symmetrical diamine is piperazine.

14. A process according to claim 8 wherein said initiator is crosslinked polyvinylpyrrolidone seeds.

15. A process according to claim 8 wherein water is included in the reaction mixture.

* * * * *

UNITED STATES PATENT AND TRADEMARK OFFICE
CERTIFICATE OF CORRECTION

PATENT NO. : 5,866,660
DATED : FEB. 2, 1999
INVENTOR(S) : VICTOR KABANOV AND VLADIMIR GOLUBEV

It is certified that error appears in the above-indentified patent and that said Letters Patent is hereby corrected as shown below:

On the title page, item [54], and in column 1, lines 1-3:
Please correct the spelling of "PROLIDONE" in the title of the Patent in two instances to read:

--- POLYVINYLPYRROLIDONE AND CROSSLINKER WITH DIVINYL AND CHELATION GROUP ---

Signed and Sealed this

Twenty-sixth Day of October, 1999

Attest:

Q. TODD DICKINSON

*Attesting Officer*   *Acting Commissioner of Patents and Trademarks*